J. K. CHAMP.
TRACE HOLDING DEVICE.
APPLICATION FILED SEPT. 15, 1913.
1,123,095.
Patented Dec. 29, 1914.
2 SHEETS—SHEET 1.
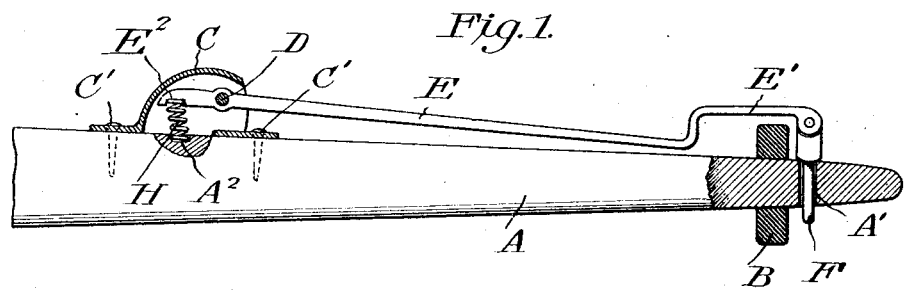
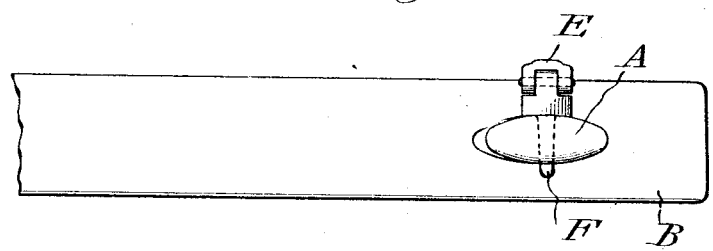
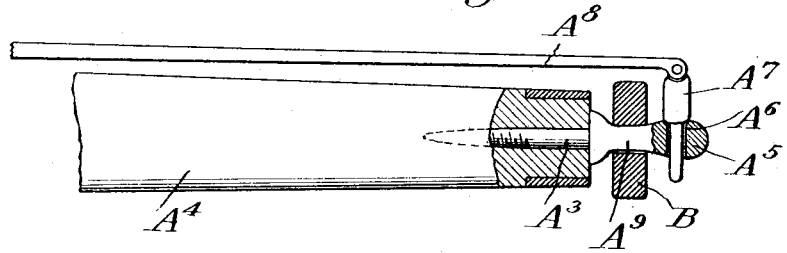
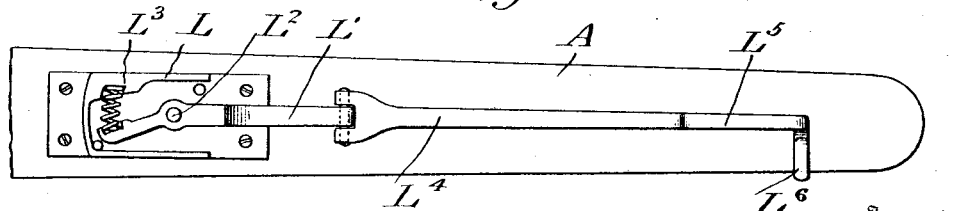
Witnesses
Inventor
John K. Champ,
By
Attorney

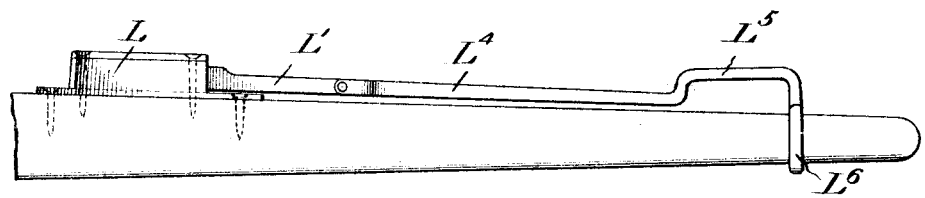
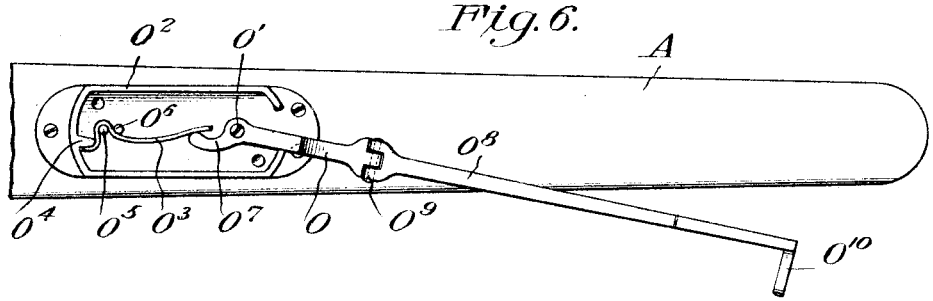
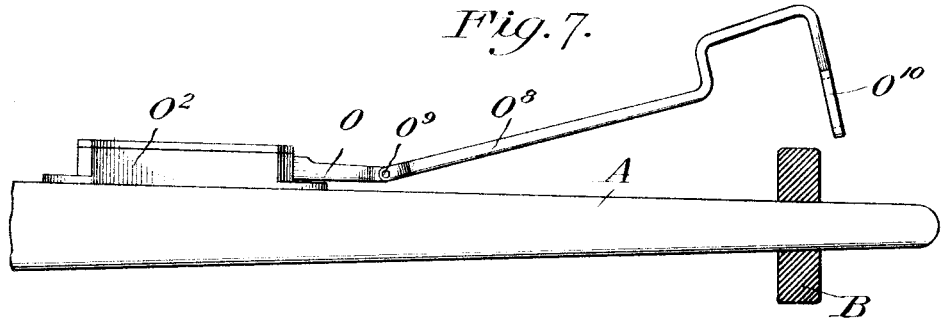

UNITED STATES PATENT OFFICE.

JOHN K. CHAMP, OF PARIS, KENTUCKY.

TRACE-HOLDING DEVICE.

1,123,095.   Specification of Letters Patent.   Patented Dec. 29, 1914.

Application filed September 15, 1913. Serial No. 789,953.

*To all whom it may concern:*

Be it known that I, JOHN K. CHAMP, a citizen of the United States, residing at Paris, in the county of Bourbon and State of Kentucky, have invented certain new and useful Improvements in Trace-Holding Devices; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in devices for holding traces upon whiffle trees and comprises a simple and efficient device of this nature having various details of construction and combinations and arrangements of parts which will be hereinafter fully described, shown in the accompanying drawings and then specifically defined in the appended claim.

I illustrate my invention in the accompanying drawings, in which:—

Figure 1 is a side elevation of a portion of the whiffle tree showing the trace holding device as applied thereto and partially in section. Fig. 2 is an end view of the trace holding device. Fig. 3 is a slight modification of the whiffle tree hook. Fig. 4 is a top plan view of a portion of whiffle tree showing a slight modification of my invention. Fig. 5 is a side elevation of the modified form shown in Fig. 4. Fig. 6 is a top plan view of a still different modified form of the trace holder. Fig. 7 is a detail view of the modified form shown in Fig. 6.

Reference now being had to the details of the drawings by letter, A designates part of a whiffle tree having an aperture A' formed near one end thereof and over which whiffle tree a trace B is adapted to be fitted. A housing, designated by letter C, is held by means of screws C' to the whiffle tree and carries a pivotal pin D mounted in the opposite walls thereof. A lever E is pivotally mounted upon the pin D and at its outer end has an offset E' therein and is adapted to engage over a trace, as shown in Fig. 1, and has pivotally connected thereto a pin F adapted to pass through the aperture A' to hold the trace upon the whiffle tree. A spring H is mounted intermediate a recess A² formed in the whiffle tree and a similar recess E² formed in the short arm of the lever E upon the under edge thereof, the purpose of said spring being to normally hold the pin in the aperture in the whiffle tree.

In Fig. 3, I have shown a slightly modified form of whiffle tree and hook in which, instead of forming an aperture in the whiffle tree, a screw A³ is fitted in the end of the whiffle tree A⁴ and is provided with an eye A⁵ which is apertured as at A⁶ for the reception of the pin A⁷ which in turn is pivotally mounted upon one end of the lever A⁸, the whiffle tree being adapted to engage over the contracted part A⁹ of the screw and held in place by the pin, as will be readily understood.

In Fig. 4 of the drawings, I have shown a slight modification of the invention in which a housing L is fastened to the upper surface of the face of the whiffle tree in the same manner as shown in Fig. 1, but in said modified form a lever L' is mounted upon a pivot L² and a spring L³ is interposed between a recess in the casing and one in the member L' and an arm L⁴ is pivotally connected to one end of the lever L' and has an offset L⁵ near its end and terminates in a lug L⁶ which is adapted to hook over the edge of the whiffle tree, the offset forming a means for the reception of the trace to be held upon the whiffle tree by said hook. In this modified form, it will be noted that the lever may be tilted and also the arm independent of the lever after the hook has been detached from the whiffle tree.

In Fig. 6 a modified form of the invention is illustrated consisting of a slightly different form of lever O pivotally mounted upon a pin O' in the housing O² and a leaf spring O³ engages a lug O⁴ and is fulcrumed about a pin O⁵ and against a second pin O⁶ and bears against a short curved arm O⁷ of the lever O. An arm O⁸ is pivotally connected at O⁹ to the long arm of the lever O and terminates in a hook O¹⁰ for engagement over the edge of the whiffle tree in the same manner as shown in Figs. 4 and 5 of the drawings.

By the provision of a whiffle tree made in accordance with my invention, it will be noted that a simple and efficient device is afforded whereby the trace may be securely held over the end of the whiffle tree by a spring suitably housed upon the whiffle tree, the end of the lever or arm connected thereto being adapted to engage the whiffle tree itself or an eye formed in a screw upon the end thereof, the trace holding end of the device being adapted to swing away from the whiffle tree when it is desired to connect the trace or detach the same therefrom.

What I claim to be new is:—

A trace holding device comprising, in combination with a whiffletree, a housing fastened thereto, said housing having an opening upon one side and a hole in the bottom thereof, the surface of the whiffletree exposed by said hole having a recess formed therein, a pin supported in the walls of the housing adjacent to the opening therein, a lever pivotally mounted upon said pin and having a recess formed in the under edge of the short arm thereof, a spring engaging said recesses, and a trace holding link pivotally connected to the end of said lever, as shown and described.

In testimony whereof I hereunto affix my signature in presence of two witnesses.

JOHN K. CHAMP.

Witnesses:
C. O. WILMOTH,
P. J. McCORD.

Copies of this patent may be obtained for five cents each, by addressing the "Commissioner of Patents, Washington, D. C."